United States Patent [19]
Ellis

[11] Patent Number: 4,902,116
[45] Date of Patent: Feb. 20, 1990

[54] HELMET DISPLAY SYSTEMS

[75] Inventor: Stafford M. Ellis, East Preston, England

[73] Assignee: GEC-Marconi Limited, United Kingdom

[21] Appl. No.: 199,537

[22] Filed: May 27, 1988

[30] Foreign Application Priority Data

Jun. 3, 1987 [GB] United Kingdom ............ 8713021

[51] Int. Cl.⁴ .................. G02B 17/08; G02B 27/10; G02B 23/10; G02B 23/04
[52] U.S. Cl. ............................ 350/501; 350/503; 350/174; 350/145
[58] Field of Search ............ 350/174, 145, 602, 601, 350/638, 622, 623, 624, 618, 503, 501

[56] References Cited

U.S. PATENT DOCUMENTS

| | | | |
|---|---|---|---|
| 3,059,519 | 10/1962 | Stanton | 350/622 |
| 3,205,303 | 9/1965 | Bradley | 350/602 |
| 3,923,370 | 12/1975 | Mostrom | 350/174 |
| 4,081,209 | 3/1978 | Heller et al. | 350/174 |
| 4,232,943 | 11/1980 | Rogers | 350/174 |
| 4,269,476 | 5/1981 | Gauthier et al. | 350/174 |
| 4,361,384 | 11/1982 | Bosserman | 350/174 |
| 4,563,061 | 1/1986 | Ellis | 350/174 |
| 4,600,271 | 7/1986 | Boyer et al. | 350/174 |
| 4,722,101 | 2/1988 | Blower | 350/638 |
| 4,761,056 | 8/1988 | Evans et al. | 350/602 |

FOREIGN PATENT DOCUMENTS 202987 11/1986 European Pat. Off. ............ 350/601

Primary Examiner—Jon W. Henry
Attorney, Agent, or Firm—Kirschstein, Ottinger, Israel & Schiffmiller

[57] ABSTRACT

A helmet display system including a display arrangement (5) located between a helmet body (1) and a helmet visor (3). The display arrangement (5) includes right and left collimating eyepieces (7,9) and a projector (11) which in operation projects bright data for reflection by the eyepieces (7,9) to respective right and left eye positions (13,15). The user 17 of the helment display system is therefore presented with a display of bright data superimposed on the view of the distant scene. Each eyepiece (7,9) is supported at a respective one of two ports (27,29) of a housing arrangement (31) containing light paths leading from a bright data source (33) of the projector (11) to the eyepieces (7,9) by way of an optical system (35) of the projector (11) including a Petzval relay lens (55,57) and reflective elements (37,45,47,49,51,53). At the right port (27) there is a clear light transmissive portion (34) which is contiguous with the right eyepiece (7). The portion (34) extends upwardly the angular range of the field of view available from the right eye position (13).

6 Claims, 4 Drawing Sheets

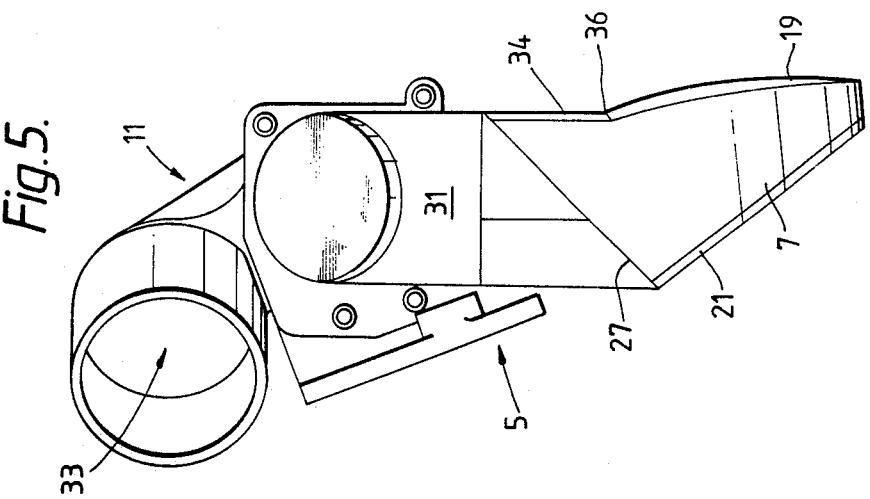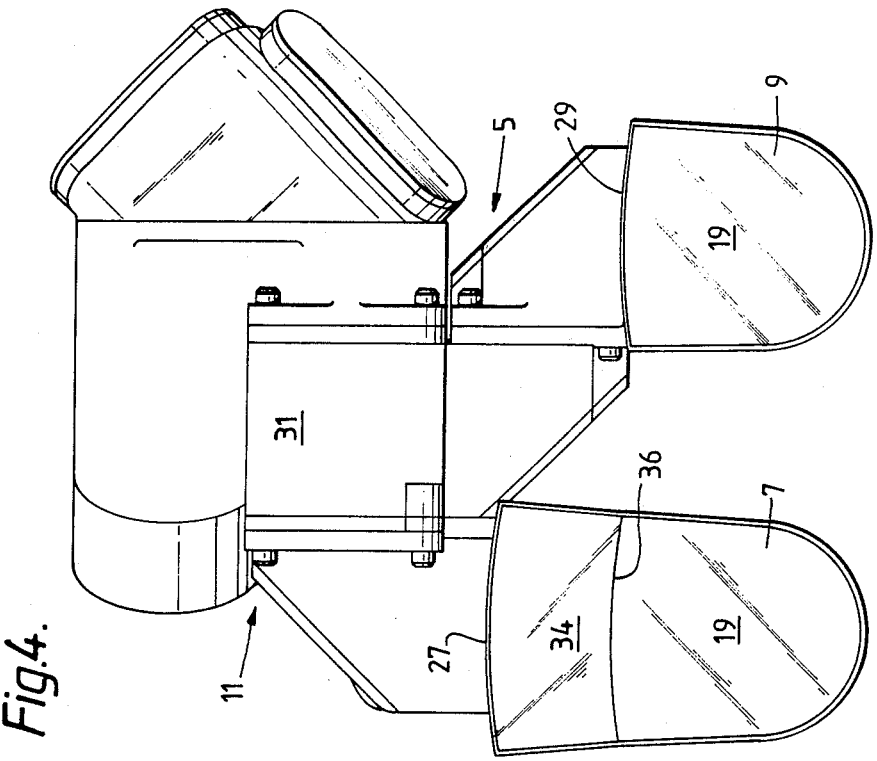

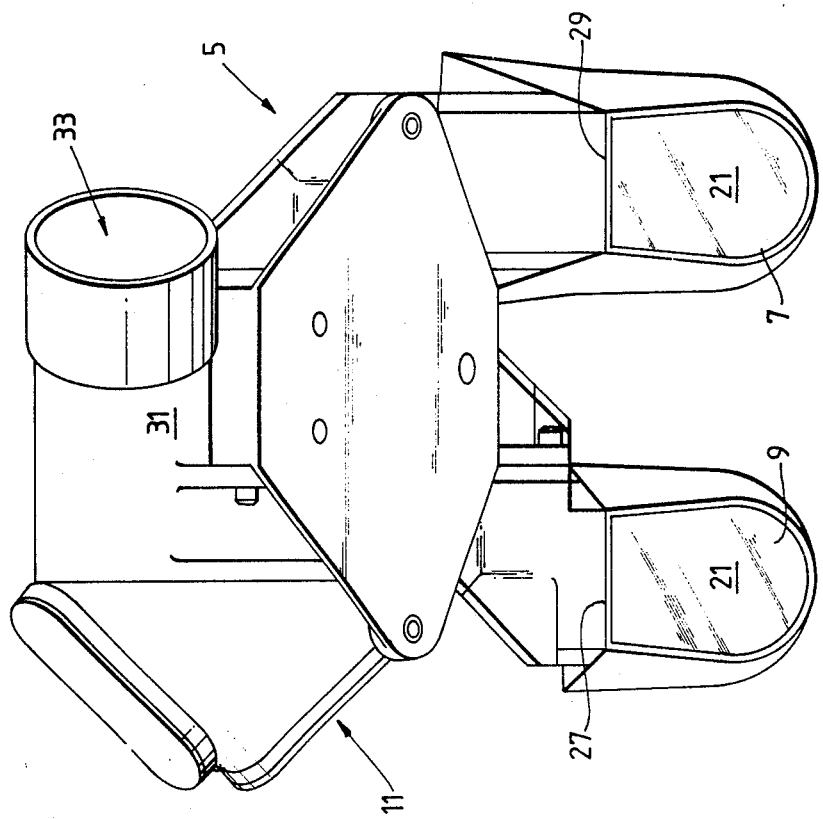
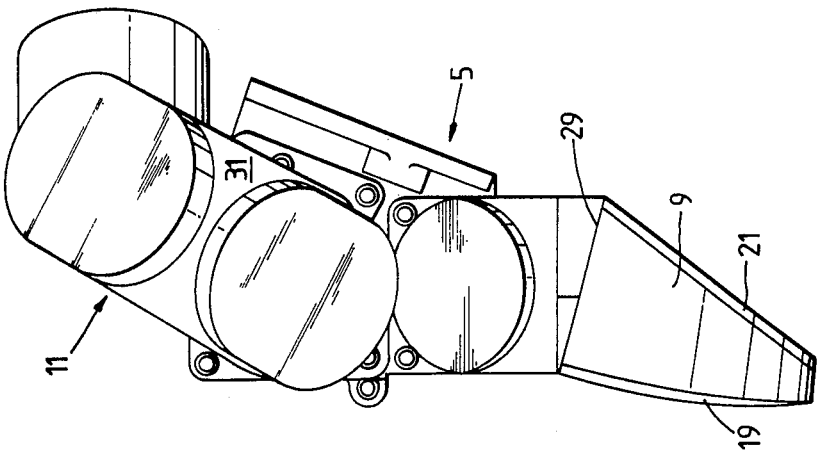

4,902,116

HELMET DISPLAY SYSTEMS

BACKGROUND OF THE INVENTION

1. Field of the Invention

This invention relates to helmet display systems.

More particularly the invention relates to helmet display systems of the kind adapted to present, when supported on a helmet, a display of bright data to a wearer of the helmet superimposed on the wearer's view of the forward scene.

2. Description of Related Art

A problem with bi-ocular display systems of the above kind is that the display arrangement of the system tends to obstruct the helmet wearer's field of view, particularly the upward field of view.

SUMMARY OF THE INVENTION

It is an object of the present invention to provide a helmet display system wherein this problem is alleviated.

According to the present invention there is provided a helmet display system including a display arrangement comprising: right and left collimating eyepieces; and projector means which in operation projects bright data for reflection by the right and left eyepieces to respective right and left eye positions; each eyepiece comprising first and second light transmissive/light reflective laminar elements defining a generally downwardly tapering space and defining at a position adjacent the wider end of the tapering space a principal focal plane of the eyepiece which is coincident with a respective one of two image planes formed by the projector means, and each eyepiece being supported at a respective one of two ports of a housing arrangement containing light paths leading from a bright data source of the projector means to the eyepieces by way of an optical system of the projector means including a relay lens and reflective elements serving in operation to direct rays from the bright data source so as to form images at the said two image planes; and wherein at at least one of the said ports of the housing arrangement, there is a light transmissive portion of the housing, the lower edge of which is contiguous with the upper edge of the light transmissive/light reflective element of the eyepiece at that port which is remote from the eye position associated with that eyepiece, thereby to extend upwardly the angular range of the field of view available from that eye position.

In one particular embodiment of the invention the optical system includes a partially light transmissive, partially light reflective first planar element positioned substantially midway between and above said eyepieces onto which rays for both said eye pieces are directed from said source via a common path, said first element serving to split said rays between a first path which includes a reflective second planar element parallel to said first element to direct the rays through substantially 90 degrees and thence downwardly to the one of the said ports at which said transmissive portion is located and a second path which includes reflective third and fourth planar elements in parallel spaced relation in planes at right angles to the plane of said first element to direct the rays through two successive turns of substantially 90 degrees in the opposite sense and thence downwardly to the other one of said ports.

BRIEF DESCRIPTION OF THE DRAWINGS

One helmet display system in accordance with the present invention will now be described, by way of example, with reference to the accompanying drawings in which:

FIG. 4 is a front view of the display arrangement;

FIG. 5 is a view from the right side of the display arrangement;

FIG. 6 is a view from the left side of the display arrangement; and

FIG. 7 is a rear view of the display arrangement.

DETAILED DESCRIPTION OF THE PREFERRED EMBODIMENTS

Figure 1:
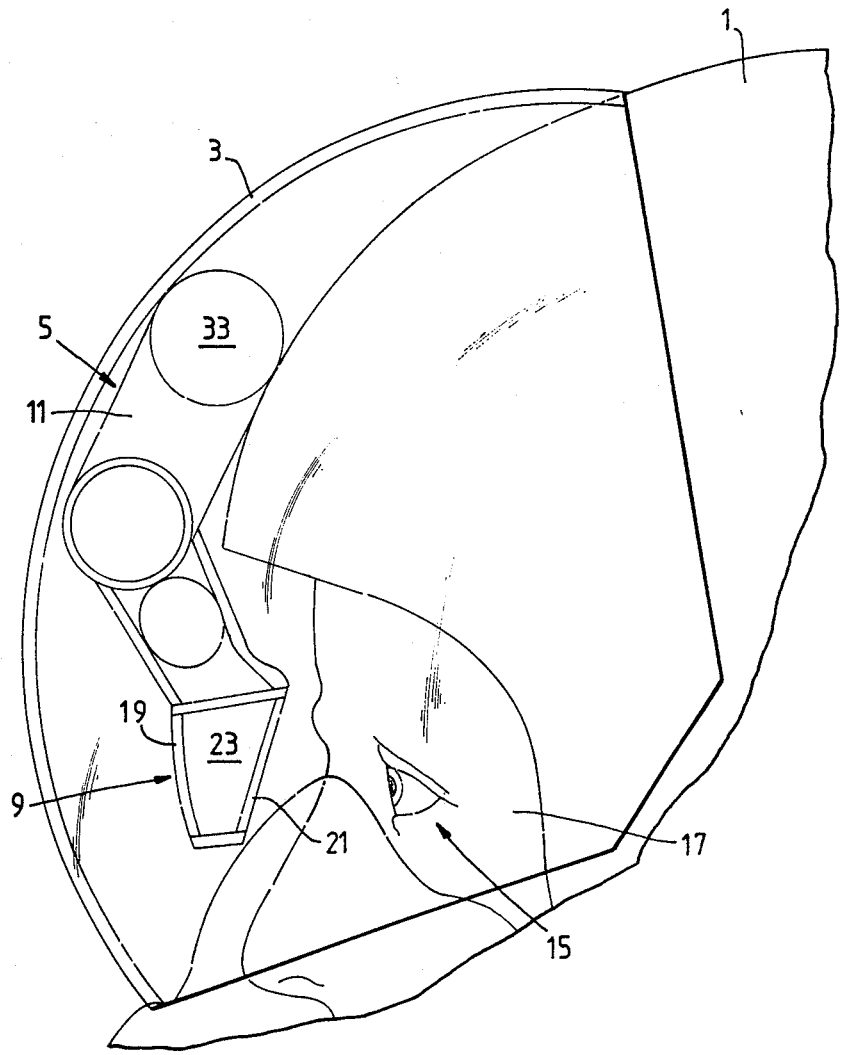
FIG. 1 is a diagrammatic view of the helmet display system from one side.
Figure 2:
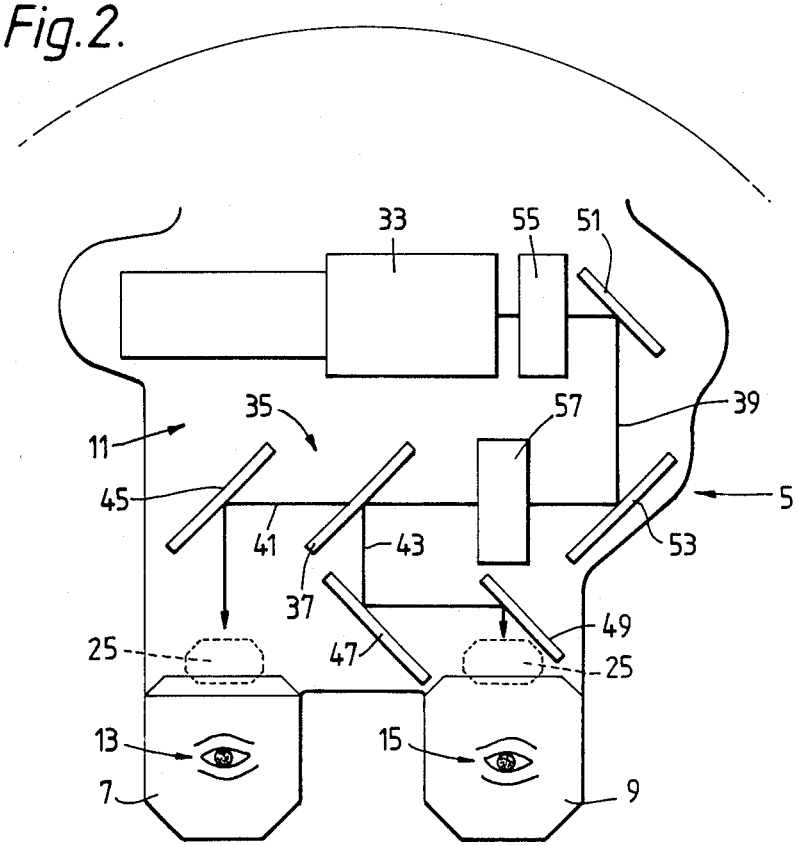
FIG. 2 is a diagrammatic internal view of the display arrangement of the helmet display system of FIG. 1.
Figure 3:
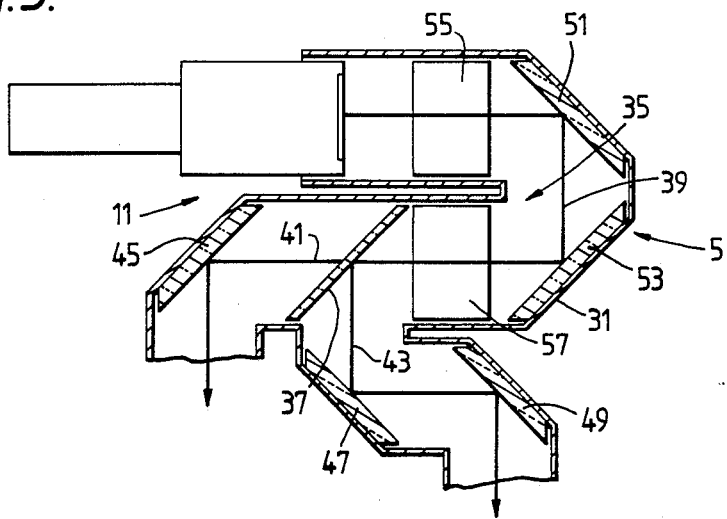
FIG. 3 is a partly sectional diagrammatic internal view of the display arrangement illustrating a housing of the display arrangement.

Referring to FIG. 1, the helmet display system comprises a helmet body 1, a helmet visor 3 and a display arrangement 5 mounted on the helmet body 1 so as to lie between the body 1 and the visor 3.

Referring to FIGS. 1 to 7, the display arrangement 5 comprises right and left collimating eyepieces 7,9 and projector means 11 which in operation projects bright data for reflection by the right and left eyepieces 7,9 to respective right and left eye positions 13,15 defined by the helmet body 1. The user 17 of the helmet display system, viewing through the eye pieces 7,9, is thus presented with a display of bright data superimposed on his view of the forward scene through the eyepieces 7,9.

Each eyepiece 7,9 comprises forward and rear light transmissive/light reflective laminar elements 19,21 defining therebetween a generally downwardly tapering space 23 and defining at a position adjacent the wider end of the tapering space 23 a principal focal plane 25 of the eyepiece 7,9, the principal focal plane 25 of each eyepiece 7,9 being arranged to be co-incident with a respective one of two image planes 25 formed by the projector means 11. Each eyepiece 7,9 is supported at a respective one of two ports 27,29 of a housing arrangement 31 for the projector means 11 and which contains light paths leading from a bright data source 33, in the form of a cathode ray tube, of the projector means 11 to the eyepieces 7,9 by way of an optical system 35 of the projector means 11. The optical system 35 serves in operation to direct rays from the bright data source 33 so as to form images at the two image planes 25. At the right port 27 of the housing arrangement 31 there is a clear light transmissive rectangular laminar portion 34 of the housing arrangement 31, the lower edge 36 of which is contiguous with the upper edge 36 of the forward light transmissive/light reflective laminar element 19 of the right eyepieces 7 at that port 27. The portion 34 is suitably formed integrally with the element 19 with which it is contiguous. As best seen in FIG. 5, the provision of the portion 34 extends upwardly the angular range of the field of view available from the right eye position 13 through element 21.

The optical system 35 comprises a partially light transmissive, partially light reflective first planar element 37 positioned substantially midway between and above the eyepieces 7,9 and onto which rays for both eyepieces 7,9 are directed via a common path 39 from the source 33 so as to be incident on the first element 37 in a direction substantially parallel to a straight line joining the eyepieces 7,9. The element 37 splits the rays incident thereon between transmission along a first path 41 and reflection along a second path 43. The first path 41 includes a reflective second planar element 45 which is parallel to the first element 37 and folds the rays through 90 degrees and thence to the right port 27, at which the portion 34 is located, to form an image at the right one of the two image planes 25. The second path 43 includes reflective third and fourth planar elements 47,49 in parallel spaced relation in planes at right angles to the plane of the first element 37 which folds the rays through two successive turns of 90 degrees in the opposite sense and thence to the left port 29 to form an image at the left one of the two image planes 25. It is to be noted that it is the arrangement of the elements of the optical system 35, in particular the configuration of the first and second paths 41,43, which allows the incorporation of the light transmissive portion 34 in the housing arrangement 31 to extend upwardly the field of view. The common path 39 includes reflection means in the form of reflective fifth and sixth planar elements 51,53 in spaced relation, the plane of the sixth element 53 being parallel to the plane of the first element 37 and the plane of the fifth element 51 being at 90 degrees to the plane of the sixth element 53. The fifth and sixth elements 51,53 folds rays from the source 33 through two successive turns of 90 degrees in the same sense and thence to incidence on the first element 37. The common path 39 also includes a Petzval relay lens comprising first and second parts 55,57, the first part 55 being located between the source 33 and the fifth element 51, the second part 57 being located between the sixth element 53 and the first element 37. The various items of the projector means 11 are all supported by the housing arrangement 31 within passages in the housing arrangement 31.

In a modification of the system described by way of example by increasing the vertical spacing between the optical system 35 and the eyepieces 7,9, sufficient space may be made to accommodate a transmissive portion of the housing corresponding to the portion 34, but adjacent the left port 27, thus extending upwardly the user's field of view for the left eye, as well as the right eye.

I claim:

1. A helmet display system including a display arrangement comprising: right and left collimating eyepieces; and projector means which in operation projects bright data for reflection by the right and left eyepieces to respective right and left eye positions; each eyepiece comprising first and second light transmissive/light reflective laminar elements defining a generally downwardly tapering space and defining at a position adjacent the wider end of the tapering space a principal focal plane of the eyepiece which is coincident with a respective one of two image planes formed by the projector means, and each eyepiece being supported at a respective one of two ports of a housing arrangement containing light paths leading from a bright data source of the projector means to the eyepieces by way of an optical system of the projector means including a relay lens and reflective elements serving in operation to direct rays from the bright data source so as to form images at the said two image planes; and wherein at at least one of the said ports of the housing arrangement, there is a light transmissive portion of the housing, the lower edge of which is contiguous with the upper edge of the light transmissive/light reflective element of the eyepiece at that port which is remote from the eye position associated with that eyepiece, thereby to extend upwardly the angular range of the field of view available from that eye position; and wherein the optical system includes a partially light transmissive, partially light reflective first planar element positioned substantially midway between and above said eyepieces onto which rays for both said eyepieces are directed from said source via a common path, said first element serving to split said rays between a first path which includes a reflective second planar element parallel to said first element to direct the rays through substantially 90 degrees and thence downwardly to the one of the said ports at which said transmissive portion is located and a second path which includes reflective third and fourth planar elements in parallel spaced relation in planes at right angles to the plane of said first element to direct the rays through two successive turns of substantially 90 degrees in the opposite sense and thence downwardly to the other one of said ports; and wherein said rays for both said eyepieces are incident on said first element in a direction substantially parallel to a straight line joining said eyepieces for passage along said first path after transmission through said first element and passage along said second path after reflection by said first element.

2. A system according to claim 1 wherein said light transmissive portion is integral with said light transmissive/light reflective element with which it is contiguous.

3. A system according to claim 1 wherein said light transmissive portion is of substantially rectangular laminar form.

4. A system according to claim 1 wherein said common path includes reflection means to fold the rays for both said eyepieces through two successive turns of substantially 90 degrees in the same sense during passage along said common path.

5. A system according to claim 6 wherein said relay lens comprises first and second parts, said first part being located in said common path between said source and said reflection means and said second part being located in said common path between said reflection means and said first element.

6. A system according to claim 1 wherein said display arrangement is mounted on a helmet so as to lie between the body of the helmet and a visor of the helmet.

* * * * *